United States Patent
Roberston et al.

(10) Patent No.: US 10,013,327 B2
(45) Date of Patent: Jul. 3, 2018

(54) MONITOR, INTEGRATED CIRCUIT AND METHOD FOR MONITORING AN INTEGRATED CIRCUIT

(71) Applicants: Alistair Paul Roberston, Glasgow (GB); Andrew Edward Birnie, Bearsden (GB); Thomas Henry Luedeke, Oberbergkirchen (DE)

(72) Inventors: Alistair Paul Roberston, Glasgow (GB); Andrew Edward Birnie, Bearsden (GB); Thomas Henry Luedeke, Oberbergkirchen (DE)

(73) Assignee: NXP USA, Inc., Austin, TX (US)

( * ) Notice: Subject to any disclaimer, the term of this patent is extended or adjusted under 35 U.S.C. 154(b) by 56 days.

(21) Appl. No.: 15/100,037

(22) PCT Filed: Dec. 9, 2013

(86) PCT No.: PCT/IB2013/060753
§ 371 (c)(1),
(2) Date: May 27, 2016

(87) PCT Pub. No.: WO2015/087110
PCT Pub. Date: Jun. 18, 2015

(65) Prior Publication Data
US 2017/0031795 A1 Feb. 2, 2017

(51) Int. Cl.
*G06F 11/00* (2006.01)
*G06F 11/30* (2006.01)
(Continued)

(52) U.S. Cl.
CPC ........ *G06F 11/3048* (2013.01); *G06F 1/3287* (2013.01); *G06F 11/0736* (2013.01);
(Continued)

(58) Field of Classification Search
CPC ............ G06F 11/0736; G06F 11/0739; G06F 11/0757; G06F 11/3048;
(Continued)

(56) References Cited

U.S. PATENT DOCUMENTS 5,408,645 A * 4/1995 Ikeda .................. G06F 11/0757
714/37
5,526,264 A 6/1996 Niggemann et al.
(Continued)

FOREIGN PATENT DOCUMENTS

EP 0691244 A2 1/1996
EP 1089187 A2 4/2001

OTHER PUBLICATIONS

International Search Report for application No. PCT/IB2013/060753, dated Sep. 4, 2014, 14 pages.

*Primary Examiner* — Michael C Maskulinski

(57) ABSTRACT

The present invention provides a monitor, especially a wake up monitor, for monitoring an integrated circuit, the monitor comprising a first monitoring unit configured to monitor at least one input of the integrated circuit, a second monitoring unit configured to monitor at least one output of the integrated circuit, a measurement unit configured to measure the time elapsed between an event on the at least one input and a reaction to the event on the at least one output and configured to output an alert signal if the elapsed time exceeds a predetermined first time limit. The present invention furthermore discloses an integrated circuit and a method for monitoring an integrated circuit.

20 Claims, 6 Drawing Sheets

(51) Int. Cl.
　　　*G06F 11/07*　　　(2006.01)
　　　*G06F 1/32*　　　(2006.01)
　　　*G06F 11/32*　　　(2006.01)
　　　*G06F 11/34*　　　(2006.01)

(52) U.S. Cl.
　　　CPC ...... *G06F 11/0739* (2013.01); *G06F 11/0757* (2013.01); *G06F 11/3037* (2013.01); *G06F 11/327* (2013.01); *G06F 11/3423* (2013.01)

(58) Field of Classification Search
　　　CPC ..... G06F 1/32–1/3296; G05B 19/0428; G05B 23/00; G05B 23/02
　　　See application file for complete search history.

(56) References Cited

U.S. PATENT DOCUMENTS

| | | | |
|---|---|---|---|
| 6,820,220 B1 | 11/2004 | Dominke et al. | |
| 9,778,904 B2* | 10/2017 | Talbot | G06F 7/00 |
| 2003/0204792 A1* | 10/2003 | Cahill | G06F 11/0757 714/55 |
| 2003/0233156 A1* | 12/2003 | Pihet | G05B 19/0428 700/79 |
| 2004/0122565 A1* | 6/2004 | Sakurai | F02D 41/062 701/1 |
| 2004/0153887 A1 | 8/2004 | Whetsel | |
| 2007/0040717 A1 | 2/2007 | Goetting et al. | |
| 2009/0271548 A1* | 10/2009 | McAslan | G06F 9/4812 710/260 |
| 2010/0241282 A1 | 9/2010 | Culshaw et al. | |

\* cited by examiner

MONITOR, INTEGRATED CIRCUIT AND METHOD FOR MONITORING AN INTEGRATED CIRCUIT

FIELD OF THE INVENTION

This invention relates to a monitor, especially a wake up monitor, for monitoring an integrated circuit. The invention also relates to an integrated circuit and a method for monitoring an integrated circuit.

BACKGROUND OF THE INVENTION

Modern integrated circuits, especially microcontrollers or similar programmable integrated circuits are used in a variety of applications which require acting on certain input signals.

In many applications a transition on an input pin, an action, leads to an indication to the outside world via an output pin, a reaction. This form of operation is especially predominant on microcontrollers supporting low power modes.

For example, in the automotive industry, such microcontrollers can be used in window control. When a window switch is pressed, a microcontroller wakes up and executes a window control software. Finally, the window control software drives output pins of the microcontroller to drive the window motor to move the window upwards or downwards. Another example is the headlight control in a vehicle. If the headlight switch is pressed or switched on a microcontroller executes a lamp driver software and directly or indirectly turns on the lamps of the headlights. An indirect control of the lamps can include sending a control signal over a bus system, e.g. a SPI bus. As a last example the seat adjustment can be mentioned, where a seat adjustment switch is pressed and a microcontroller executes a seat control software which drives the seat motors via output pins of said microcontroller.

Common to all these examples is that as a reaction to a signal transition on an input pin of the microcontroller said microcontroller starts executing a software which generates an output signal on another pin of the microcontroller.

To reduce the power consumption of the respective microcontrollers in many applications the microcontroller is put into an energy saving power mode when no input signal is detected at least for a specific amount of time. This reduces the power consumption of the microcontroller but makes necessary a wake up operation on the detection of an input signal on an input pin of the microcontroller.

After a wake up of a microcontroller certain monitoring means in the microcontroller can be activated. Such monitoring means can include a watchdog of the microcontroller or the like. It may happen in some cases that the microcontroller enters an operational state after a wake up procedure which allows the microcontroller to service the watchdog. Therefore, in such a system no error will be detected if there is an error in the microcontroller that allows the microcontroller to service the watchdog but prevents the microcontroller from executing the control software.

US 2009/0271548 shows a method which allows monitoring in a microcontroller if an interrupt is serviced in a predetermined period of time. If this is not the case according to US 2009/0271548 it is possible to raise the interrupt priority or to reset the device.

SUMMARY OF THE INVENTION

The present invention provides a monitor, especially a wake up monitor, for monitoring an integrated circuit having the features of claim 1, an integrated circuit having the features of claim 17 and a method for monitoring an integrated circuit having the features of claim 21.

The present invention is based on the conclusion that monitoring integrated circuits in general, not only the servicing of interrupts in integrated circuits, would improve the reliability of the integrated circuit.

According to the present invention at least one input of the integrated circuit is monitored for a specific action on said input. If such an action is detected on said input of the integrated circuit the measurement unit starts measuring the time it takes the integrated circuit to produce a specified reaction or result based on said action.

The present invention provides a first monitoring unit to monitor the at least one input of the integrated circuit and a second monitoring unit to monitor the at least one output of the integrated circuit.

It is, therefore, possible to specify specific inputs of the integrated circuit as triggers for the measurement unit and specific outputs of the integrated circuit at which the reaction should be detected. Consequently, the present invention provides a very flexible possibility to monitor an integrated circuit in detail. Especially, with the present invention it is not only possible to monitor internal details of the integrated circuit, like e.g. interrupts. The present invention also allows to monitor if the reaction is correctly forwarded to an output and thus to a specific peripheral which can be connected to said output. This greatly improves the reliability of an integrated circuit.

Specific embodiments of the invention are set forth in the dependent claims.

In an embodiment the input is an input pin of the integrated circuit, especially an input pin configured to transition the integrated circuit from one power state to another power state on a signal transition at the input pin, and/or an input pin configured to cause an interrupt in the integrated circuit. Using a pin of the integrated circuit as input allows easy monitoring of external actions like the pushing of button.

In an embodiment the output is an output pin of the integrated circuit. Using pins of the integrated circuit as output it can easily be monitored if the reaction is sent to the correct recipient.

In an embodiment the first monitoring unit is configured to monitor a signal transition on the input of the integrated circuit. Signal transitions are a characteristic feature of every signal transmission. Monitoring for a signal transition therefore allows very easy detection of an action outside the integrated circuit which has to be processed by the integrated circuit.

In an embodiment the second monitoring unit is configured to monitor a write and/or read access to a first memory address, wherein the first memory address is configured to control an output state of the output. In modern integrated circuits the output pins are usually mapped to memory addresses and write accesses to that memory addresses can be performed to directly change the state of an output pin. Therefore monitoring the respective memory address allows indirectly monitoring the output without the need to directly access the electronic data line which is connected to the output.

In an embodiment the alert signal is a non-maskable reset. Additionally or alternatively the alert signal can be a system reset, especially a functional system reset or a destructive system reset, and/or a power supply logic signal configured to cause a power supply to power cycle the integrated circuit. If the reaction does not occur within the specified time limit the probability of a severe error in the integrated circuit is high. A reset or a power cycle of the integrated circuit will therefore restart or reboot the integrated circuit from scratch. If the error was e.g. caused by software problems and not by permanent hardware malfunctions chances are high that a restart will heal said problem.

In an embodiment the monitor comprises at least one first control value for every monitored output, each first control value indicating a respective first offset from a predefined first base address, or each first control value indicating a respective first address range, wherein the first base address indicates the base address of general purpose input output registers of the integrated circuit, wherein each respective first offset represents the difference between the first base address and the address of the general input output register representing the respective output, and wherein each respective first address range represents a peripheral of the integrated circuit or a memory region associated with the peripheral. If the reaction the integrated circuit should produce is associated to an output via a memory scheme that is based on the first base address and an offset the respective output can be very flexibly defined. If an address range is indicated e.g. a complete peripheral can be monitored effectively.

In an embodiment the monitor comprises an interface configured to receive first configuration information and/or second configuration information and/or third configuration information and/or fourth configuration information. Using an interface to flexibly configure the monitor allows easily adapting the monitor to a plurality of different use cases without the need to change the hardware of the monitor.

In an embodiment the first configuration information comprises the respective first offsets and/or the respective first address ranges.

In an embodiment the second configuration information comprises an indication of the at least one input the first monitoring unit is configured to monitor.

In an embodiment the measurement unit comprises a counter configured to count the elapsed time, and the measurement unit is configured to output the alert signal if the elapsed time exceeds a predetermined first time limit or is lower than a second time limit. Using two time limits it is possible to define a time span which will qualify the reaction as valid. Therefore, a reaction which occurs too fast after the input action is received can be qualified as erroneous for being too fast. This is especially useful if the calculation time for producing the reaction is known.

In an embodiment the third configuration information comprises the first time limit and/or the second time limit.

In an embodiment the second monitoring unit is configured to monitor a predetermined reaction in the integrated circuit, and the fourth configuration information indicates the reaction. If different reactions can be specified not only a read or write access to a memory location can be monitored.

In one embodiment the predetermined reaction is not only a read or write access to a memory address but comprises a complex procedure in the integrated circuit, like for example the initiation of a peripheral like a data bus, for example a CAN or a SPI or a FlexRay bus. The complex procedure can also include the transmittal of data or the calculating and storing of a specific data value at a specific memory location. In such examples not only the act of writing to or reading from a data address is monitored but the content which is written or read from the data address is actively analysed. This provides great flexibility in monitoring the integrated circuit.

In one embodiment the monitor comprises at least one second control value for every monitored input with each second control value indicating a respective second offset from a predefined second base address, or each second control value indicating a respective second address range, wherein the second base address indicates the base address of general purpose input output registers of the integrated circuit, wherein each respective second offset represents the difference between the second base address and the address of the general input output register representing the respective input, wherein each respective second address range represents a peripheral of the integrated circuit or a memory region associated with the peripheral. Using an addressing scheme based on a base address and an offset or an address range allows the same flexibility in defining the input pin as is already provided for the output pin.

In one embodiment the interface is configured to receive fifth configuration information and/or sixth configuration information, wherein the fifth configuration information comprises the respective second offsets.

In one embodiment the sixth configuration information comprises initial counter values. These initial counter values can be used to initialize an up or down counter in the measurement unit. A counter can automatically indicate if the count reaches zero, in the case of a down counter, or if the count reaches the maximum counter limit, in the case of an up counter. Using initial counter values for up or down counters in the measurement unit therefore allows monitoring a time interval without the need to include a complex comparator logic in the measurement unit. Such a comparator unit would be needed if a single up counter and two time limit values were used to monitor the time limit.

In one embodiment the monitor comprises at least one register, wherein the at least one first control value and/or the at least one second control value are stored in the at least one register. If the control values are stored in registers and not in memory locations they can be accessed very quickly.

In one embodiment the monitor or at least part of the monitor is part of a low power domain of the integrated circuit. This excludes the monitor from the process and the influence of power mode switching of the integrated circuit.

In one embodiment the integrated circuit comprises a watchdog unit, the watchdog unit comprising the monitor.

In one embodiment the second monitoring unit is a snoop logic configured to snoop the address bus of the respective general purpose input output registers or the respective general purpose input output controller. This allows providing monitoring of the first memory address with a logic of very low complexity.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
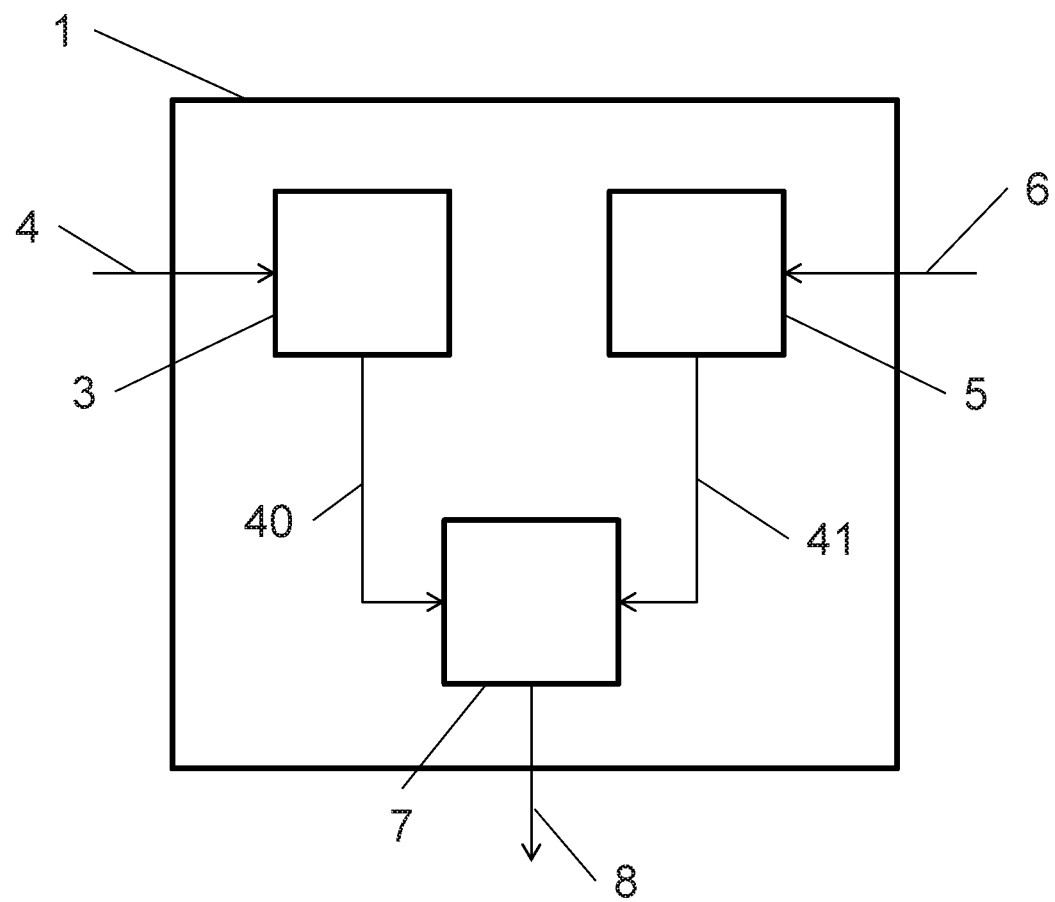
FIG. 1 schematically shows an example of an embodiment of a monitor according to the present invention.

FIG. 1 schematically shows an example of an embodiment of a monitor 1 according to the present invention.

The monitor 1 comprises a first monitoring unit 3 and a second monitoring unit 5 which are both coupled to the measurement unit 7.

First monitoring unit 3 is configured to monitor an input 4 of an integrated circuit 2 in which the monitor 1 is integrated or which the monitor 1 is configured to monitor. In the same way second monitoring unit 5 is configured to monitor an output 6 of the integrated circuit 2 in which the monitor 1 is integrated or which the monitor 1 is configured to monitor.

First monitoring unit 3 is coupled with the measurement unit 7 to inform the measurement unit 7 of an action or event 40 happening on the input 4. Second monitoring unit 5 is coupled to the measurement unit as well and informs measurement unit 7 of a reaction 41 to the event 40, when the reaction 41 happens on the output 6 of the integrated circuit 2.

The measurement unit 7 starts measuring the time after receiving an information about the event 40 from the first monitoring unit 3 and stops measuring the time after receiving an information about the reaction 41 from the second monitoring unit 5. The measurement unit then compares the measured time with a predetermined first time limit 26 and outputs an alarm signal 8 if the measured time or the elapsed time exceeds the time limit 26.

In one embodiment the monitor 1 is embodied as digital logic circuitry, especially as integrated digital logic circuitry. The monitor 1 can be integrated in the integrated circuit 2 or the monitor 1 can be placed externally to the integrated circuit 2 and can e.g. be coupled to an address bus of a GPIO (General Purpose Input Output) controller of the integrated circuit 2.

Furthermore, in another embodiment the monitor 1 can be embodied as a computer program product and can be executed by a programmable logic unit or a microprocessor. The microprocessor executing the computer program of monitor 1 can for example be a low power surveillance processor in a multi-processor integrated circuit 2. In further embodiments the monitor 1 can be embodied as a combination of digital logic circuitry and a computer program product.

Figure 2:
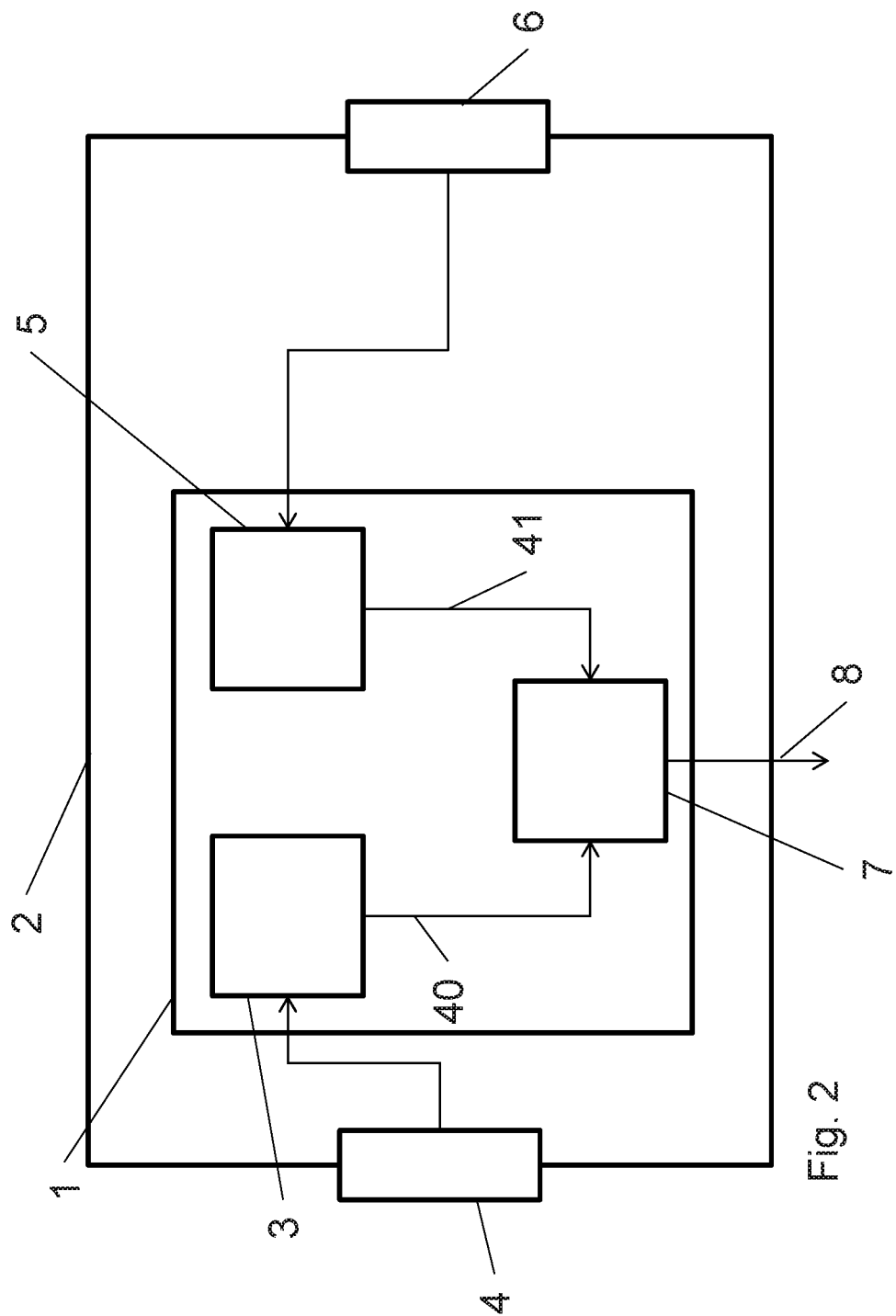
FIG. 2 schematically shows an example of an embodiment of an integrated circuit according to the present invention.

FIG. 2 schematically shows an example of an embodiment of an integrated circuit 2 according to the present invention.

The integrated circuit 2 comprises the monitor 1 of FIG. 1 and an input 4 as well as an output 6. The input 4 of the integrated circuit 2 is coupled to the first monitoring unit 3 of the monitor 1 and the output 6 of the integrated circuit 2 is coupled to the second monitoring unit 5 of the monitor 1.

The integrated circuit 2 can be a microprocessor of an embedded system, especially of an embedded control system. In other embodiments the integrated circuit 2 can be any computer, processor, microcontroller or microprocessor. In one embodiment the integrated circuit 2 comprises an operating system and/or application software. The integrated circuit 2 can be any digital logic that generates a reaction 41 after receiving an input event 40.

Figure 3:
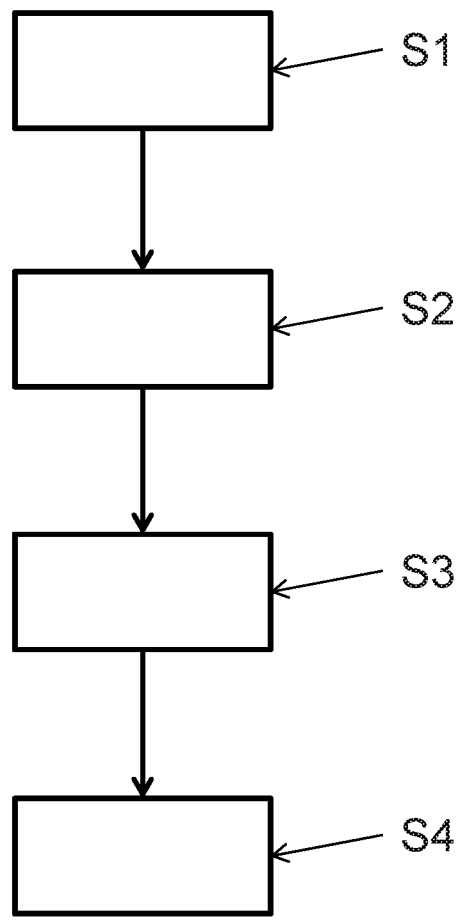
FIG. 3 schematically shows an example of an embodiment of a method according to the present invention.

FIG. 3 schematically shows an example of an embodiment of a method according to the present invention.

The method for monitoring an integrated circuit 2 comprises three steps.

In a first step S1 at least one input 4 of the integrated circuit 2 is monitored. In a second step S2 at least one output 6 of the integrated circuit 2 is monitored. A third step S3 includes measuring the time elapsed between an event 40 on the at least one input 4 and a reaction 41 to the event 40 on the at least one output 6. Finally in step S4 an alert signal 8 is outputted if the time elapsed exceeds a predetermined first time limit 26.

In one embodiment the input 4 of the integrated circuit 2 is an input pin 10 of the integrated circuit 2. The input pin 10 in one embodiment is a pin configured to transition the integrated circuit 2 from one power state to another power state on a signal transition at the input pin 10. This can for example be a wake-up pin of the integrated circuit 2. In one embodiment the output 6 is an output pin 11 of the integrated circuit 2.

In another embodiment monitoring S1 at least one input 4 comprises monitoring a signal transition on the input 4 of the integrated circuit 2.

Monitoring S2 at least one output 6 comprises in one embodiment monitoring a write and/or read access to a first memory address 15, wherein the memory address is configured to control an output state of the output 6.

In one embodiment monitoring S1 at least one input 4 comprises monitoring a second memory address of the integrated circuit 2.

The first memory address 15 and the second memory address can both be calculated based on a respective first base address 17 or a respective second base address 29 and a respective first offset 19 or a respective second offset 30.

In such an embodiment the first base address 17 can indicate the base address of general purpose input output registers 18 of the integrated circuit 2, and each respective first offset 19 represents the difference between the first base address 17 and the address of the general input output register representing the respective output 6.

In another embodiment the first memory address 15, and/or the second memory address indicates a respective first address range 20 or a second address range 31, respectively. Such an address range could be coupled to a peripheral device like a bus controller, or a GPIO controller, or the like.

In one embodiment the second base address 29 indicates the base address of general purpose input output registers 18 of the integrated circuit 2. The second base address 29 can be the same address as the first base address 17. In another embodiment the second base address 29 can be different than the first base address 17. Each respective second offset 30 represents the difference between the second base address 29 and the address of the general input output register representing the respective input 4.

In one embodiment outputting S4 an alert signal 8 comprises outputting the alert signal 8 if the elapsed time exceeds a predetermined first time limit 26 or is lower than a predetermined second time limit 27.

In another embodiment the monitoring S2 of an output 6 comprises monitoring the result produced by a program routine which is executed in the integrated circuit 2. This can comprise comparing a result value with an expected value or the like. For example the content of a memory address at which the result of the program routine is stored could be read to be compared to the predefined value.

In another embodiment monitoring S2 of an output 6 comprises monitoring complex peripherals of the integrated circuit 2 like e.g. a bus controller for a CAN bus, a SPI bus, a FlexRay bus or the like.

The alert signal 8 in one embodiment is a signal, which causes the integrated circuit to restart or reboot. For example the alert signal 8 can be a non-maskable reset, a system reset, especially a functional or a destructive system reset, or a power supply logic signal configured to cause a power supply to power cycle the integrated circuit 2.

Figure 4:
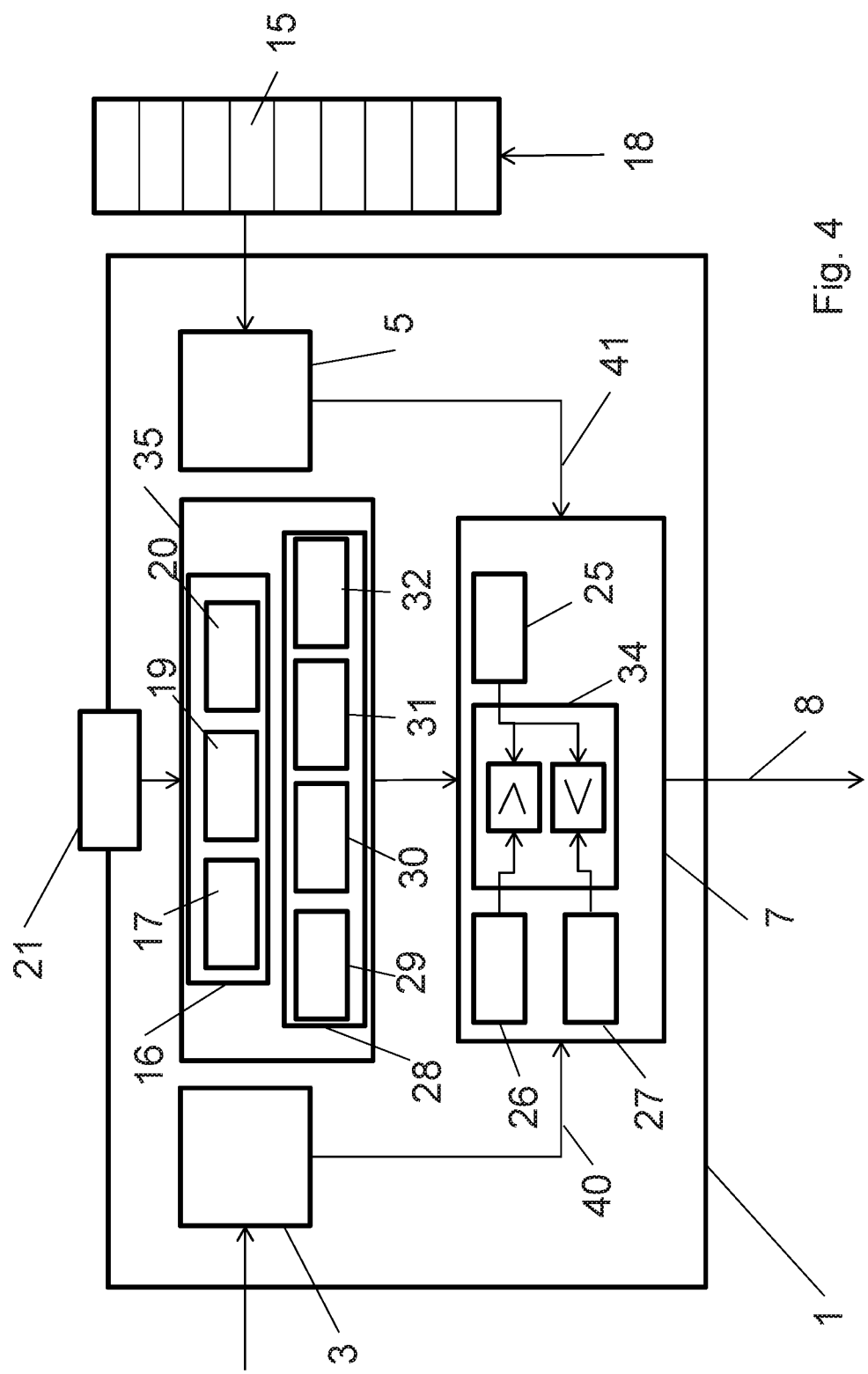
FIG. 4 schematically shows an example of an embodiment of a monitor according to the present invention.

FIG. 4 schematically shows an example of an embodiment of a monitor 1 according to the present invention.

The monitor 1 of FIG. 4 is based on the monitor 1 of FIG. 1 and further comprises a register 35, which holds a first control value 16 and a second control value 28. Furthermore, the monitor 1 comprises an interface 21.

The first control value 16 comprises a first base address 17, a first offset 19 and a first address range 20. The first base address 17 is the start address of a memory segment of the integrated circuit 2, the memory segment comprising memory registers which are coupled to the output 6. The first offset 19 is the relative address of the register for the output 6 starting from the first base address 17. In other words the sum of the first base address 17 and the first offset 19 is the absolute memory address of the register for the output 16. This sum makes up the first memory address 15. In FIG. 4 the first memory address 15 is located in the memory range of a block of general purpose output registers 18.

In FIG. 4 the first control value 16 next to the first offset 19 comprises a first address range 20. The first address range 20 can be the address range 20 of an output peripheral which in one embodiment can incorporate the output 6. In such an embodiment the output 6 can e.g. be a bus peripheral like a CAN bus controller, a SPI bus controller or the like.

In one embodiment the first control value 16 comprises either the first base address 17 together with the first offset 19 or the first address range 20. In another embodiment the first base address 17 is a fixed memory address which is hardcoded into monitor 1 and thus is not stored in the first control value 16.

The second control value 28 comprises a second base address 29, a second offset 30 and a second address range 31. In addition to these data the second control value 28 in FIG. 4 also comprises initial counter values 32. The second base address 29, the second offset 30 and the second address range 31 comprise the same information as the first base address 17, the first offset 19 and the first address range 20 not for the output 6 but for the input 4.

Consequently, the second base address 29, and the second offset 30 in sum are equal to the second memory address, and the second base address 29 is the start address of a memory segment of the integrated circuit 2, the memory segment comprising memory registers which are coupled to the input 4. In one embodiment the first base address 17 is equal to the second base address 29. In this case the input and the output belong to a common set of inputs and outputs and are referenced by e.g. the same set of general purpose input output registers 18. In another embodiment the first base address 17 is different than the second base address 29.

In another embodiment the second control value 28 does not comprise the second base address 29, the second offset 30 or the second address range 31. In this embodiment the second control value 28 comprises an indication of which input 4 or input pin 10 should monitored. If the input 4 or input pin 10 is a wakeup pin or an interrupt pin the first monitoring unit 3 can be connected to a wakeup controller or an interrupt controller of the integrated circuit 2 to forward the input signal to the first monitoring unit 3.

The interface 21 is configured to receive the first control value 16 and the second control value 28. In one embodiment the interface is also configured to receive only parts of the first control value 16 and the second control value 28. The interface 21 can be any type of programming interface 21 which is capable of receiving the first control value 16 and the second control value 28. In one embodiment the interface 21 is embodied as a memory address which can be written to. In one embodiment the amount of bytes written to the memory address corresponds to the amount of bytes of the contents of the first control value 16 and the second control value 28.

For example in one embodiment the output 6 is an output pin 11 of the integrated circuit 2 and the input 4 is an input pin 10 of the integrated circuit 2. Therefore, the first control value 16 comprises the first base address 17 together with the first offset 19 and the second control value comprises the second base address 29 and the second offset 30. If every value was 1 byte wide a four byte value would have to be written to the interface 21 in order to set these values. If every value was 2 bytes wide an eight byte value would have to be written to the interface 21 in order to set these values.

In another embodiment the interface 21 is a more flexible and intelligent interface 21. In such an embodiment, the interface could for example be represented by two memory addresses, wherein one memory address would represent a command register and the other memory address would address a data register of the interface 21. In such an example different commands could be defined for the interface. For example the value 0x01 could be the command to set the first base address 17. Consequently, if the value 0x01 is written to the command register and another value is written to the data register the value written to the data register would be set as the new first base address 17 in the first control value 16. For all other data other command values can be defined. Another command value can be defined to set whether a single first memory address 15 or second memory address should be used or whether the first address range 20 or the second address range 31 should be used. In such a case the expected value in the data register could have a format where a first bit indicates whether the output 6 should be addressed based on the first offset 19 or the first address range 20 and a second bit indicates whether the input 4 should be addressed based on the second offset 30 or the second address range 31. Other embodiments of the interface 21 are also possible.

The first control value 16 and the second control value 28 according to the embodiment of FIG. 4 are stored in a register 35. The register provides fast access and low latency and therefore allows fast access to the first control value 16 and the second control value 28. In another embodiment the first control value 16 and the second control value 28 can be stored in another type of memory, e.g. a RAM, ROM, FLASH memory or the like.

In FIG. 4 the measurement unit 7 comprises a counter 25, a first time limit 26 and a second time limit 27, which are all coupled to a comparator 34.

The comparator 34 is configured to compare the value of the counter to the first time limit 26 and the second time limit 27. The comparator 34 in FIG. 4 is especially configured to check, whether the value of the counter 25 is smaller than the first time limit 26, and whether the value of the counter 25 is greater than the second time limit 27.

In one embodiment the counter 25 is started when an action is detected on input 4. Furthermore, the counter 25 is stopped when a reaction is detected on the output 6. The value of the counter 25 is constantly compared to the first time limit 26 and is compared to the second time limit 27 after the counter 25 is stopped.

In one embodiment a signal line of the first monitoring unit 3 and a signal line of the second monitoring unit 5 can be connected to an enable line of the counter 25 by an exclusive or element, XOR. An XOR element with two input lines will output a "true" signal, if only one of the inputs is "true". Therefore, the counter will start counting, when the data line from the first monitoring unit 3 signals a "true" value, and the counter 25 will stop counting when the second monitoring unit 5 signals a "true" value. Both data lines in one embodiment can be passed to a latch which will hold the values for the XOR element until the latch is reset. This resetting can in one example be done by the measurement unit 7 after completing the comparing process. If the measurement unit detects in the comparing process that the counter value of counter 25 is either smaller than the first time limit 26 or higher than the second time limit 27 the measurement unit will output the alert signal 8.

In one embodiment the measurement unit comprises only the first time limit 26 or only the second time limit 27.

In another embodiment the counter is pre-loaded with the initial counter values 32 of the second control value 28. In another embodiment the initial counter values 32 additionally or alternatively hold the value of the first time limit 26 and/or the second time limit 27.

The general purpose input output registers 18 of FIG. 4 are a set of registers of the integrated circuit 2 which make reference to input pins and output pins of the integrated circuit 2. This means that the general purpose input output registers 18 represent the single pins of the integrated circuit 2 in such a way that reading from the general purpose input output registers 18 will yield the current state of the input pins or output pins of the integrated circuit 2. In one embodiment every memory address represents one pin. If a value is read from such a memory address of the general purpose input output registers 18 a value of 0x00 would represent a logic value of 0 at the specific pin and a value different than 0x00 would represent a logic value of 1 at the specific pin. In another embodiment every bit at a memory address represents a single pin. Therefore the value 0x00 would set 8 pins to a logic value of 0.

If the pin is an input pin of the integrated circuit 2 the value which is read from the respective register characterises the external signal at the respective pin. A write operation to an input pin will not change the state of the pin. If the pin is an output pin of the integrated circuit 2 a write operation to the respective register of the general purpose input output registers 18 will change the state of the pin according to the value written to the respective register. If the respective register of an output pin is read the value can indicate the current state of the pin.

The monitor 1 in FIG. 4 shows one of every element the monitor 1 comprises. In other embodiments the monitor 1 is configured to monitor more than one input 4 and more than one output 6. In such an embodiment the monitor 1 can comprise a first control value 16 and a second control value 28 as well as a first monitoring unit 3, and/or a second monitoring unit 5 and/or a measurement unit 7 for every input 4 and output 6 which is to be monitored.

In one embodiment the second monitoring unit 5 comprises logic which is configured to snoop the address bus of the respective general purpose input output registers 18 or the respective general purpose input output controller. Such snoop logic would monitor said address bus for a data access to the first memory address 15. In a simple embodiment the snoop logic would only monitor the address bus for any activity at the respective memory address. In another embodiment the snoop logic monitors the address bus for a specific activity, like read or a write access at the respective memory address.

In yet another embodiment the snoop logic also monitors the content of a specific write or read access to the respective address. In such an embodiment the snoop logic would also comprise logic to snoop the data bus of the respective general purpose input output registers 18. In yet another embodiment the second monitoring unit 5 comprises a snoop logic configured to monitor complex events at the output 6. Such complex events can comprise a series of predefined data writes or reads from or to a specific memory address or to different memory addresses.

A simple snoop logic, which only monitors the address bus for any activity at the respective memory address, could easily be implemented by comparators, wherein the data on the address bus is compared to the first memory address 15. If an access to the first memory address 15 is performed the first memory address 15 is present on the data lines of the data bus and the comparator will output a "true" signal.

During the operation of the monitor 1 in an integrated circuit 2 the case can occur, where a further event 40 can be detected at the input 4 by the first monitoring unit 3 while a first event 40 is already processed. For such cases the monitor 1 can be configured in one embodiment to continue monitoring the first event 40 and not to monitor the second event 40. In another embodiment the monitor 1 can be configured to stop monitoring the first event 40 and start monitoring the second event 40. In yet another embodiment the monitor 1 can comprise duplicates of all elements which are necessary to monitor multiple events 40 at the same time and be configured to monitor multiple events 40 at the same time.

Figure 5:
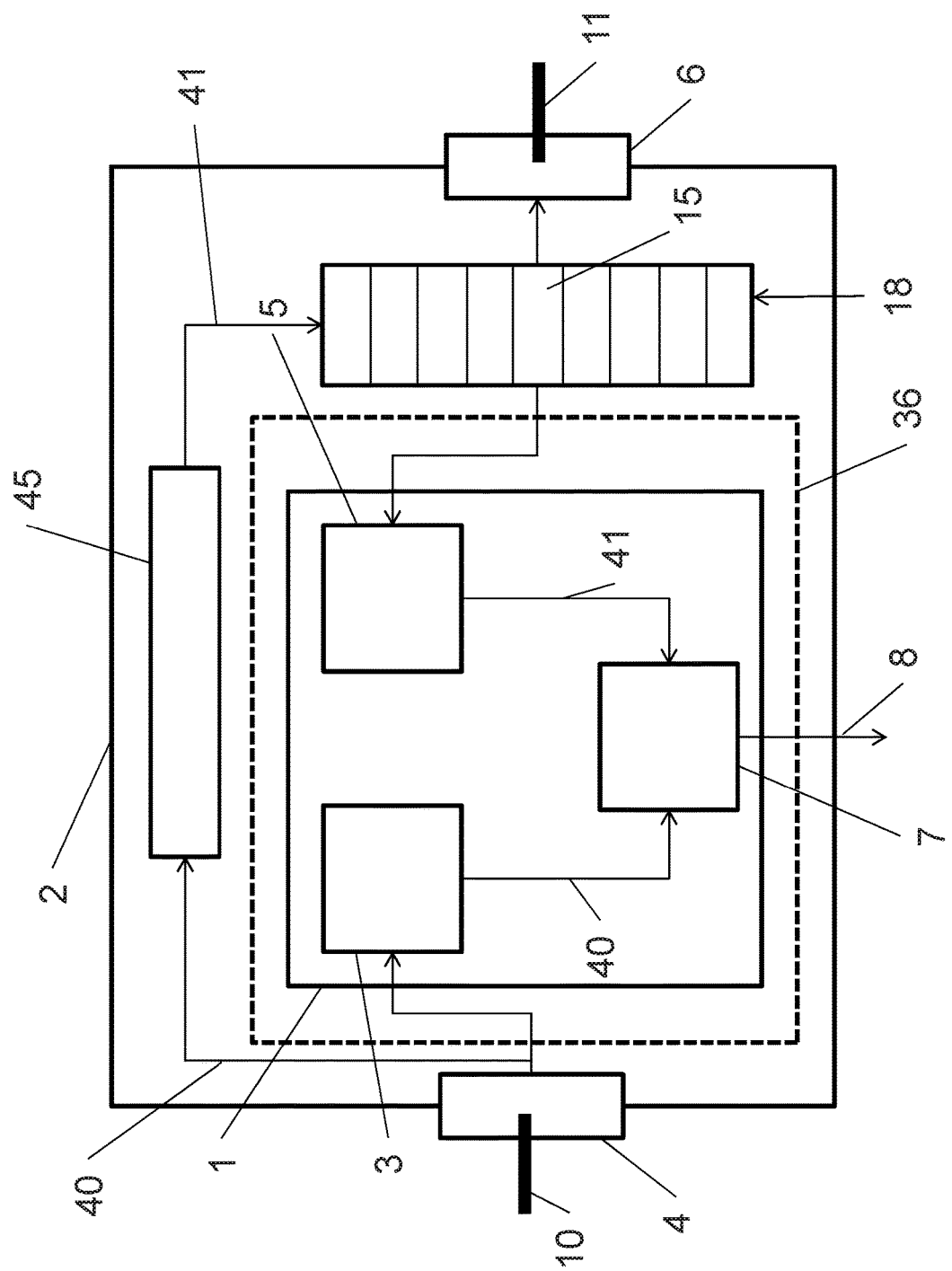
FIG. 5 schematically shows an example of an embodiment of an integrated circuit according to the present invention.

FIG. 5 schematically shows an example of an embodiment of an integrated circuit 2 according to the present invention.

The integrated circuit 2 of FIG. 5 comprises a monitor 1. A first monitoring unit 3 is connected to an input 4 of the integrated circuit 2, and especially to an input pin 10 of the integrated circuit 2. Furthermore, a second monitoring unit 5 of the monitor 1 is connected to general purpose input output registers 18 of the integrated circuit 2, wherein the general purpose input output registers 18 represent an output 6, and especially an output pin 11 of the integrated circuit 2. The monitor 1 of FIG. 5 is located in a low power domain 36 of the integrated circuit 2.

In FIG. 5 the input pin 10 is directly connected to the first monitoring unit 3. The input pin 10 is an input pin 10 which is configured to wake up the integrated circuit 2 from a sleep mode, or a low power mode. In general terms the input pin 10 is configured start a transition from one power state of the integrated circuit 2 to another power state of the integrated circuit 2. In most cases this will be a transition from any form of low power mode of the integrated circuit 2 to a power mode which allows the integrated circuit 2 to process input signals and generate output signals.

In another embodiment the input pin 10 is configured as an input pin 10 which causes an interrupt flag of the integrated circuit 2 to be set on a signal transition on the input pin 10. In another embodiment the input pin 10 is a general input output pin which is configured as input pin 10. In such a case the connection between the input pin 10 and the first monitoring unit 3 could also be embodied indirectly via general purpose input output register 18 or another set of general purpose input output registers. In such an embodiment the first monitoring unit 3 would have to actively supervise the state of the pin or its respective general input output register.

Although the monitor 1 of FIG. 5 shows the elements of the monitor 1 of FIG. 1 and was selected for ease of understanding the embodiment of the integrated circuit 2 of FIG. 5 is not limited to this monitor 1. In fact the embodiment of the integrated circuit 2 can be combined with any embodiment of the monitor 1.

In FIG. 5 the monitor 1 is embodied in the low power domain 36 of integrated circuit 2 in its entirety. In other embodiments only certain parts of monitor 1 can be embodied in the low power domain 36.

The low power domain 36 of integrated circuit 2 will be powered when the integrated circuit 2 is in a low power state. Therefore, the elements of the monitor 1 which are located in the low power domain 36 of the integrated circuit 2 will also remain active when the integrated circuit 2 is in a low power mode and therefore are not influenced by the power mode switching of the integrated circuit 2.

In one embodiment the first monitoring unit 3 and/or the second monitoring unit 5 are connected to physical pads of the respective input 4 or output 6, and thus directly monitor the maximum signal path in the integrated circuit 2.

In one embodiment the alert signal 8 is directed to a reset controller (not shown in FIG. 5) of the integrated circuit 2 to provoke a reset of the integrated circuit 2. The reset controller can be configured to execute a non-maskable reset, or a system reset, especially a functional system reset or a destructive system reset.

The alert signal 8 in one embodiment can also be directed to the power supply (not shown in FIG. 5) or to a power supply controller (not shown in FIG. 5) of integrated circuit 2. The alert signal 8 can cause a power supply, or the power supply controller to power cycle the integrated circuit 2.

In one embodiment the monitor 1 or at least some elements of monitor 1 are comprised by a wakeup controller of integrated circuit 2.

In one embodiment the integrated circuit 2 comprises an application 45 which produces the reaction 41 to the event 40. In one embodiment the application 45 is a software application 45 or a computer program product 45 which is executed by a processor of the integrated circuit 2. The application 45 can be directly executed by the processor of the integrated circuit 2 or the application 45 can be scheduled to be executed and executed by an operating system, OS, which is running on the processor of the integrated circuit 2.

In one embodiment the computer program product 45 can be stored in a non-volatile memory of the integrated circuit 2 or can be stored on a data carrier which can be accessed by the integrated circuit 2. In another embodiment the application 45 is embodied in hardware as a plurality of logic gates, like e.g. in an ASIC (Application Specific Integrated Circuit).

The application 45 in some cases may produce no write access to the first memory address 15 as a result of a correct processing of the event 40 of the input 4. In such cases the monitor 1 will never detect the reaction 41 and will therefore output an alert signal 8. To prevent an alert signal 8 from being output by the monitor 1 in such cases the application 45 may be configured to execute at least a read access to the first memory address 15 or to write the value to the first memory address 15 which is already stored there. This will not change the output 6 or the state of the output pin 11 but will prevent the monitor 1 from outputting the alert signal 8 because no reaction 41 could be detected after detecting the event 40.

The integrated circuit 2 can be any type of integrated circuit, for example, the integrated circuit 2 can be a microcontroller, a microprocessor, a system-on-a-chip, SOC, an ASIC or the like. The integrated circuit 2 can be a general purpose integrated circuit 2 or an application specific integrated circuit 2 which comprises e.g. specific driver elements needed for a certain application. Such driver elements can for example comprise motor drivers, like Power MOSFETs, optical drivers or the like.

Figure 6:
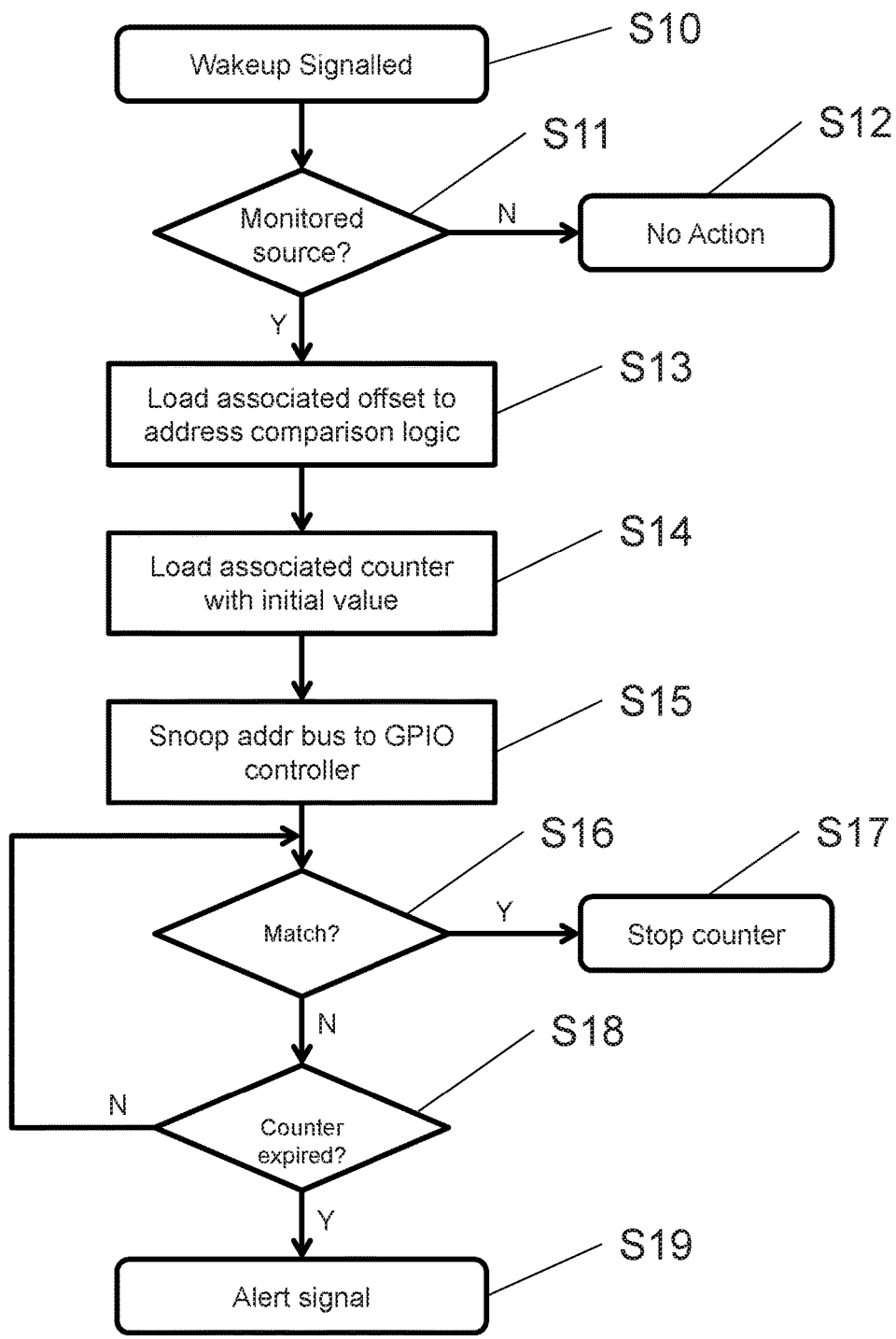
FIG. 6 schematically shows an example of an embodiment of a method according to the present invention.

FIG. 6 schematically shows an example of an embodiment of a method according to the present invention.

In step S10 a wakeup is signalled. This can in one embodiment be caused by a signal transition on an input pin 10 of integrated circuit 2. In other embodiments an interrupt or a simple input signal can be signalled.

In step S11 it is checked whether the source of the wakeup is a monitored source or not. If the source of the wakeup is not a monitored source the method ends in step S12 with no action taken.

If in step S11 it is found that the source of the wakeup is a monitored source the method continues with step S13 in which the first offset 19 is loaded to an address comparison logic of the second monitoring unit 5.

Furthermore, in step S14 the counter 25 is loaded with an initial counter value 32. In other embodiments the counter 25 can also be loaded or configured with a specific divider and a trigger or clock.

In step S15 the second monitoring unit 5 starts snooping the address bus of a general input output controller of integrated circuit 2.

The consecutive steps S16 and S18 form a loop, wherein in step S16 the current value of the address bus is compared to the first offset 19 or the sum of the first offset 19 and the first base address 17 by the address comparison logic. If no match is detected step S18 monitors if the counter 25 has expired. If a match is detected, the counter is stopped and the execution cycle of the method ends.

If in step S18 it is determined that the counter 25 has expired and a match was detected previously an alert signal 8 is generated in step S19. The counter 25 expiring can mean that the counter counted to zero in the case of a down counter or that the counter reached its maximum value in the case of an up counter, or that the counter value exceeds the first time limit 26.

The method of FIG. 6 monitors a single first memory address 15 for any read or write access by comparing the first memory address 15 to the data on the address bus of integrated circuit 2.

If more than one first memory addresses or more than one source of event 40 should be monitored the method of FIG. 6 can be executed in parallel for as many times as needed by the specific application.

The method according to the present invention is not limited to the steps shown in FIG. 6 and more steps are possible or the order of the steps can be changed.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one data token or data element or data value. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. For example, the monitor 1 can be embodied as an integral element of the integrated circuit 2.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrase "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

LIST OF USED REFERENCE SIGNS 1 monitor
2 integrated circuit
3 first monitoring unit
4 input
5 second monitoring unit
6 output
7 measurement unit
8 alert signal
10 input pin
11 output pin
15 first memory address
16 first control value
17 first base address
18 general purpose input output registers
19 first offset
20 first address range
21 interface
25 counter
26 first time limit
27 second time limit
28 second control value
29 second base address
30 second offset
31 second address range
32 initial counter values 34 comparator
35 register
36 low power domain
40 event
41 reaction
45 application
S1-S4, S10-S10 method steps

The invention claimed is:

1. A monitor, for monitoring an integrated circuit, the monitor comprising:
a first monitoring unit configured to monitor an input pin of the integrated circuit, and to detect an event at the input pin, wherein the input pin is a wakeup pin of the first monitoring unit;
a second monitoring unit configured to monitor at least one output of the integrated circuit, and to detect a reaction on the output that corresponds to an event detected at the input pin;
a measurement unit configured to measure a time elapsed between the event on the input pin and the reaction to the event on the at least one output and configured to output an alert signal if the elapsed time exceeds a predetermined first time limit.

2. The monitor of claim 1, wherein the input pin is configured to transition the integrated circuit from one power state to another power state on a signal transition at the input pin.

3. The monitor of claim 1, wherein the output is coupled to an output pin of the integrated circuit.

4. The monitor of claim 1, wherein the first monitoring unit is configured to monitor a signal transition on the input pin of the integrated circuit.

5. The monitor of claim 1, wherein the second monitoring unit is configured to monitor a write or read access to a first memory address; wherein the first memory address is configured to control an output state of the output.

6. The monitor of claim 1, wherein the alert signal is selected from a group including:
a non-maskable reset;
a system reset, especially a functional system reset or a destructive system reset; and
a power supply logic signal configured to cause a power supply to power cycle the integrated circuit.

7. The monitor of claim 1, comprising at least one first control value for every monitored output, each first control value indicating a respective first offset from a predefined first base address, or each first control value indicating a respective first address range;
wherein the predefined first base address indicates a base address of general purpose input output registers of the integrated circuit;
wherein each respective first offset represents a difference between the predefined first base address and an address of the general input output register representing a respective output; or
wherein each respective first address range represents a peripheral of the integrated circuit or a memory region associated with the peripheral.

8. The monitor of claim 7, wherein the first configuration information comprises the respective first offsets or the respective first address ranges.

9. The monitor of claim 7, comprising at least one register, wherein the at least one first control value and at least one second control value are stored in the at least one register.

10. The monitor of claim 1, comprising an interface configured to receive at least one of following: first configuration information, second configuration information, third configuration information, and fourth configuration information.

11. The monitor of claim 10, wherein the second configuration information comprises an indication of at least one input the first monitoring unit is configured to monitor.

12. The monitor of claim 10,
wherein the measurement unit comprises a counter configured to count the elapsed time; and
wherein the measurement unit is configured to output the alert signal if the elapsed time exceeds a predetermined first time limit or is lower than a second time limit; and
wherein the third configuration information comprises the first time limit or the second time limit.

13. The monitor of claim 10,
wherein the second monitoring unit is configured to monitor a predetermined reaction in the integrated circuit; and
wherein the fourth configuration information indicates the reaction.

14. The monitor of claim 10, comprising at least one second control value for every monitored input each second control value indicating a respective second offset from a predefined second base address, or each second control value indicating a respective second address range;
wherein the predefined second base address indicates a base address of general purpose input output registers of the integrated circuit;
wherein each respective second offset represents a difference between the predefined second base address and the address of the general input output register representing a respective input; or
wherein each respective second address range represents a peripheral of the integrated circuit or a memory region associated with the peripheral.

15. The monitor of claim 14, wherein the interface is configured to receive fifth configuration information and sixth configuration information;
wherein the fifth configuration information comprises the respective second offsets; and
wherein the sixth configuration information comprises initial counter values.

16. The monitor of claim 1, wherein the monitor or at least part of the monitor is part of a low power domain of the integrated circuit.

17. An integrated circuit, comprising:
an input pin, wherein the input pin is a wakeup pin of the first monitoring unit;
at least one output; and
a monitor comprising a first monitoring unit configured to monitor the input pin and to detect an event at the input pin, a second monitoring unit configured to monitor the at least one output and to detect a reaction on the output that corresponds to an event detected at the input pin, and a measurement unit configured to measure a time elapsed between the event on the input pin and the reaction to the event on the at least one output and configured to output an alert signal if the elapsed time exceeds a predetermined first time limit.

18. The integrated circuit of claim 17,
wherein the integrated circuit is configured to transition from one power state to another power state on a signal transition at the input pin;
wherein the output is coupled to an output pin of the integrated circuit;

wherein the first monitoring unit is configured to monitor a signal transition on the input pin of the integrated circuit;

wherein the second monitoring unit is configured to monitor write and read accesses to a first memory address, wherein the first memory address is configured to control an output state of the output; and wherein the alert signal is selected from a group including: a non-maskable reset, a system reset, especially a functional system reset or a destructive system reset, and a power supply logic signal configured to cause a power supply to power cycle the integrated circuit.

19. The integrated circuit of claim 17, comprising:
a low power domain, the low power domain comprising the monitor or at least part of the monitor.

20. The integrated circuit of claim 17, comprising:
a watchdog unit, the watchdog unit comprising the monitor.

\* \* \* \* \*